May 29, 1934.  K. P. BRACE  1,960,658
DEW POINT CONTROL DEVICE
Filed March 19, 1931
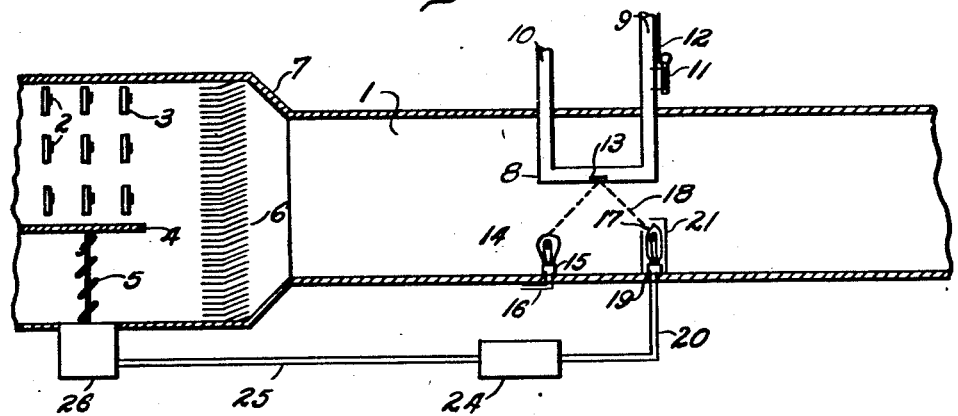
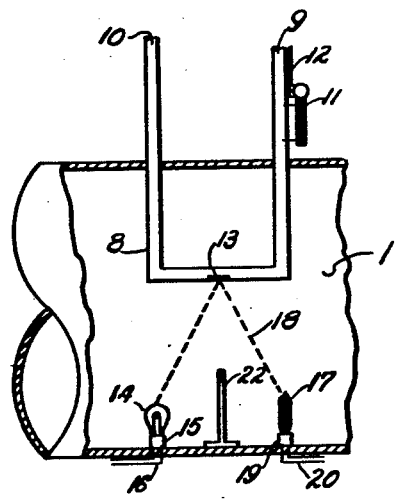
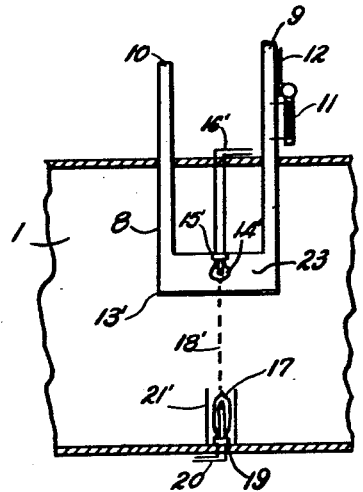
Inventor:
Kemper P. Brace
By Brown, Jackson, Boettcher & Diemer
Attorneys Patented May 29, 1934

1,960,658

UNITED STATES PATENT OFFICE 1,960,658

DEW POINT CONTROL DEVICE

Kemper P. Brace, Chicago, Ill., assignor of one-half to William J. Binkley, Chicago, Ill.

Application March 19, 1931, Serial No. 523,769

4 Claims. (Cl. 236—44)

This invention relates to dew point control systems, and more particularly to systems which are designed to control the humidity of an air stream which might be used in ventilating systems, for certain chemical processes, or for certain types of shop work.

Broadly, this invention, by sensing the dew point of the air stream after it has been through the conditioning apparatus, controls the humidity of the air stream, the control being by means of electrically-operated water sprays or similar humidifying apparatus. This is accomplished by predetermining the dew point temperature desired in the air stream, and, with the apparatus described, causing water vapor to be added to the air stream if the dew point temperature of the air stream is below the predetermined temperature, or causing the air to be dehumidified if its dew point temperature is above the predetermined temperature.

In ventilating and similar systems in which an air supply is needed possessing certain characteristics of humidity and temperature, it has heretofore been impossible to control accurately both the humidity and temperature of intake air so as to condition it properly. The tendency has been to condition air by the customary conditioning apparatus controlled by a predetermined setting corresponding to the desired requirements, but the air which has been so conditioned is not subsequently tested to determine whether it has the characteristics which are required of it. In many cases, where the conditioning apparatus has been set to effect a certain humidity and temperature in the conditioned air, the unconditioned intake air may vary enough in its original humidity and temperature characteristics to unbalance the effect of the conditioning apparatus. A partial solution of this difficulty is a thermostatically-controlled system, whereby samples of the conditioned air are taken and the humidity determined, and correction then made in the conditioning means. This has not generally proved efficient because of the time interval necessary during which the correction must be made, and the necessity of complicated apparatus for determining the humidity.

It is the purpose of the present invention to overcome this difficulty by providing a control system adapted to sense accurately the dew point of the unsaturated air stream after it leaves the conditioning room, and to regulate, by suitable dampers, or by-passes, the control for maintaining in the air stream the humidity which is desired at that particular time. The sensing of the dew point is accomplished by means of what might be termed an electrical "dew point stat."

The "dew point stat" is adapted to be placed in the duct leading from the suction of the fan, which fan forces the conditioned air through the system. A beam of light is reflected from a highly polished surface placed in the interior of the duct, onto a photo-electric cell, which cell is connected, by means of suitable amplifiers and relays, to controlling devices consisting of suitable water sprays and nozzles, or by-passes adapted to prevent the unconditioned air from receiving any moisture. This highly polished surface is maintained at a temperature corresponding to the dew point temperature which is required in the air stream. Thus if the air stream has a dew point temperature above that desired, condensation will form on the highly polished surface and will prevent the beam of light from being reflected. This will cause less current to flow from the photo-electric cell, and by proper arrangement will control the conditioning mechanism so as to cause less water vapor to be added to the system. If the air stream has a dew point temperature considerably below the dew point temperature required, the beam of light will be completely reflected from the highly polished surface and will cause the photo-electric cell to conduct its full capacity of current. By suitable control mechanism, this will allow water vapor to be sprayed into the system, causing the air to have a higher dew point temperature. When the dew point temperature of the air stream rises higher than the dew point temperature desired, moisture will form upon the highly polished surface and the photo-electric cell, because of the decreased current flowing through it, will control suitable dampers to again bring the dew point temperature of the air stream below that which is desired. Thus the device acts as a regulator and controlling system which will permit very little variability from the desired dew point temperature.

In order to point out more in detail the particular method and means which I employ in carrying out my invention, I shall now describe it in connection with the accompanying drawing, in which:

Figure 1 is a more or less diagrammatic view of a section of ventilating duct with the control system installed therein;

Figure 2 is an enlarged view of one modification of the control system installed in a duct;

Figure 3 is a view similar to Figure 2 showing another embodiment of the invention; and Figure 4 is a diagrammatic view showing one method of controlling the temperature of the circulating water.

Referring now to Figure 1, a ventilating duct 1 is shown leading from an air conditioning system. This air conditioning system is not shown in detail, but contains water sprays 2 extending from suitable sets of pipes 3. These sprays 2 are adapted to add water vapor to the air stream if more moisture is desired in the air. A partition 4 divides the duct, allowing air to flow through the duct on both sides of the partition 4. Louvres 5 are positioned in the portion of the duct which has no conditioning apparatus in it and are adapted to control the amount of unhumidified air passing through the duct. Thus, by varying the opening of the louvres 5, the humidity of the air stream in the system can be varied, as when the louvres 5 are opened, permitting full flow through that portion of the duct controlled by the louvres, the air stream will contain less moisture per unit volume than when the louvres are closed, and all the air is by-passed through the water sprays 2. The air, after leaving this portion of the duct, encounters plates 6 which are adapted to thoroughly mix the air stream and form it into a homogeneous mixture. The air then enters the duct 1 through the contracting section 7.

Installed in the main duct 1 adjacent the contracting section 7 is a highly-polished metal tube 8, having an inlet 9 and outlet 10. Installed in the inlet 9 is a thermostat indicated at 11 which is set at the desired dew point temperature and is electrically connected, by means of wires 12, to suitable control means for maintaining the temperature in the tube 8 at the desired dew point temperature. In order to keep this temperature as constant as possible, a fluid, such as water, is circulated through the inlet 9 into the highly-polished metal tube 8, and then out through the outlet 10. The highly-polished metal tube 8 preferably has a flattened portion 13, which portion is situated in a plane parallel to the axis of the duct.

In Figure 4, I have disclosed one way in which the temperature of the water in tube 8 can be controlled. The thermostat 11 in this figure comprises a thermometer having the mercury column 28 extending vertically therein, and having the extending tube portion 29 extending into the conduit 9 and subject to the temperature of the water flowing therein. A source of electric current 30 is led into the mercury column 28 and is adapted to pass through a small metallic float positioned thereon to either contact 27 or contact 26 positioned in the upper portions of the thermostat 11 and spaced apart vertically. Leads 12 conduct the current from these contacts to suitable controlling apparatus, lead 12a being connected to an electrically operated valve 24 connected in a cold water supply line 25, and lead 12b being connected to a resistance heater disposed in the conduit 9.

In operation, as long as the mercury column is below the desired temperature point, the contact 27 will be engaged, serving to heat the water in the conduit 9, but as the temperature rises, the float will rise and disengage contact 27. Continued rise of temperature will cause the float to engage the contact 26 and the actuating valve 24 to admit cold water into the conduit 9. Thus control of the temperature of the water in conduits 8 and 9 will be effected, serving to maintain the water within a limited temperature range.

A suitable source of light, such as a common incandescent bulb, is indicated at 14, being secured in socket 15 placed in the wall of the duct 5. This bulb is connected to any suitable electrical power source by means of wires 16. The light rays emanating from the bulb 14 strike the flattened portion of the tube 8 and are reflected onto the photo-electric cell indicated at 17. The path of this light is shown by the dotted line 18. The photo-electric cell 17 is secured in a socket 19 in the wall of duct 5 and connected by wires 20 to a suitable means of amplification, as indicated at 24, for controlling the water spray and dampers that are used in conditioning the air. The photo-electric current, after being amplified, leaves the amplification means 24, and is conducted by wires 25 to a suitable control 26. This control 26 is adapted to actuate the louvres 5, which in turn will control the humidity of the air stream. The less the amount of light received by the photo-electric cell, the greater is the quantity of air passed through the louvres, thus lowering the humidity of the air stream. The greater the amount of light received by the photo-electric cell, the smaller is the quantity of air passed through the louvres, and the humidity of the air stream is increased.

The cell 17 is surrounded by a suitable shield 21 which is adapted to prevent any light except that reflected from the flat portion 13 of the tube 8 from reaching the cell, thus assuring that the current in the cell will be controlled only by the ray of light reflected from the portion 13 of the tube 8.

As the air passes through the duct 5, it comes in contact with the metal tube 8. This tube is maintained at the desired dew point temperature by means of a fluid in the pipe, and if the air stream has a dew point temperature higher than the desired temperature, moisture will form upon the tube 8, also upon the flattened portion 13, and the ray of light reflected from the bulb 14 will become dimmed, if not entirely eliminated. This allows less light to reach the photo-electric cell 17, causing a smaller current to flow through this cell, and thus, by suitable control means, permitting less water vapor to be added to the incoming air. When the moisture content of the air has dropped sufficiently to lower the dew point temperature of the air below the temperature desired, the condensation upon the tube will be evaporated, and the photo-electric cell will receive the full quantity of light rays reflected from the tube. This will cause the air stream to be supplied with water vapor by means of the control system regulated by the photo-electric cell, and thus the dew point temperature will slowly rise again. Thus the dew point temperature of the air stream is kept within a very close limit and is instantly corrected whenever it passes beyond this range.

With reference to Figure 2, this is an enlarged view of the installation of Figure 1, but contains the modification of providing, instead of the shield 21 for the photo-electric cell 17 of Figure 1, an opaque screen 22 securely fastened to the wall of the duct 5 in such a manner as to prevent any light rays from being transmitted directly from the bulb 14 to the cell 17. This forms an effective screen and allows the photo-electric cell 17 to receive only the reflected rays, as shown by the dotted line 18. In other respects, the control system is identical with that shown in Figure 1 and need not be described in detail here.

In Figure 3 a further modification is shown.

In this modification the tube 8 has an expanded section indicated at 23 in which is mounted the incandescent bulb 14' secured in socket 15' and connected to a suitable source of electric power by the wire 16'. The lamp and socket are, in this embodiment, of a type suitable for use in underwater conditions. If desired, the liquid may be a non-conducting liquid, such as carbon tetrachloride, or the like. Instead of a flat portion 13 shown in Figures 1 and 2, the tube 8 carries a glass plate 13'. The tube 8 has the usual inlet 9 and outlet 10, inlet 9 having secured therein the usual thermostat 11 with its connection 12 for maintaining the desired dew point temperature in the fluid circulating through the tube. Positioned directly across from the bulb 14' and mounted on the wall of the duct is the photo-electric cell 17 secured in socket 19 on the wall of the duct 5. This cell is connected by wire 20 to suitable amplification means for controlling the humidity of the air in the conditioning apparatus. Light rays from the bulb 14' travel through the fluid in the tube 8, through the glass partition 13' and across the duct to the photo-electric cell 17' as indicated by the dotted line 18'. As long as the air stream passes through the duct 5 at a dew point temperature below the dew point temperature required, the glass plate 13' will remain free of condensation and the light rays will pass therethrough directly onto the photo-electric cell 17. When this condition is established, the full amount of current will flow from the photo-electric cell to the control mechanism, causing water vapor to be added to the air stream in the conditioning room. This will increase or raise the dew point temperature and as this dew point temperature of the air stream rises above the dew point temperature required, the air in passing the plate 13' will cause condensation upon the plate. This will result in obstruction of the light rays, causing less rays to reach the photo-electric cell 17, thus causing less current to flow through the cell to the control apparatus. This results in the cutting off of the water spray in the conditioning room, causing the humidity of the air stream to drop. As this occurs, the condensation on the plate 13' will be evaporated into the air stream, and the photo-electric cell 17 will again receive its full quota of light rays from the bulb 14'. This results in operation of the conditioning apparatus to supply moisture to the air stream, and thus the entire cycle of operation will repeat itself.

It will be apparent that with this control device the dew point temperature of the air stream flowing through the system will be held within a very limited range thus assuring practically a constant dew point temperature at all times. The dew point temperature desired may be varied at will by suitable setting of the thermostat controlling the temperature of the fluid in the tube 8, as the dew point control device will maintain the dew point of the air stream at whatever temperature required.

There are numerous other adaptations which might be made of my invention, and I do not intend to be limited to the particular method and means shown and described herein, but only in so far as defined by the spirit and scope of the appended claims.

I claim:—

1. In an air duct, means for controlling the dew point of an air stream passing through said duct, which comprises a source of light, means for reflecting rays from said light, means for maintaining said reflecting means at a predetermined temperature corresponding to the dew point temperature required in said air stream, said reflecting means causing said light rays to be reflected onto a light responsive means, electrical control means actuated by said light responsive means, variations in the intensity of the reflected light causing variations in the current passing to said control means, said control means being adapted to correspondingly vary the humidity of said air stream.

2. The method of controlling the dew point temperature of an air stream which comprises passing said air stream over a reflecting surface maintained at the desired dew point temperature, reflecting light from said surface to a light-responsive device, and actuating suitable damper means in accordance with the intensity of said reflected light for by-passing a portion of said air to reduce the moisture content thereof.

3. In an air duct, a spraying section, a by-passing section, control means for regulating the portions of air passing through each of said sections, a dew point temperature device for actuating said control means comprising a reflecting surface, means for maintaining said surface at a predetermined temperature, a source of light, and light responsive means actuated by light from said reflecting surface for operating said control means.

4. In a dew point control system for controlling the dew point of air in a passageway and including means for varying the humidity of said air anterior to said passageway, the combination of a source of light disposed in said passageway, a reflecting surface in said passageway, thermostatic means for maintaining said surface at a predetermined temperature, light responsive means adapted to receive light rays reflected from said surface, shielding means for excluding all other light rays from said light responsive means, and means actuated by said light responsive means to control said humidity varying means in accordance with the intensity of the light rays received by said light responsive means from said surface.

KEMPER P. BRACE.